Dec. 10, 1968 C. P. HAYUNGA 3,415,684

METHOD OF PRECONDITIONING DIGITAL MAGNETIC TAPE

Filed Jan. 7, 1966

INVENTOR
CARL PETER HAYUNGA

BY Bernard M. Goldman
ATTORNEY

United States Patent Office 3,415,684

Patented Dec. 10, 1968

3,415,684

METHOD OF PRECONDITIONING DIGITAL MAGNETIC TAPE

Carl Peter Hayunga, Poughkeepsie, N.Y., assignor to International Business Machines Corporation, Armonk, N.Y., a corporation of New York Filed Jan. 7, 1966, Ser. No. 519,251
8 Claims. (Cl. 134—15)

This invention relates generally to a conditioning operation for digital magnetic tape between its manufacture and its use on a digital tape drive.

When writing on magnetic tape with a digital tape drive, a digital recording error generally occurs when a minute particle adheres to the magnetic surface of the tape, which generally comprises a magnetic surface on one side of a plastic web. Such a particle lifts the magnetic transducer head gap minutely (a few thousandths of an inch) off the magnetic surface of the tape; but, nevertheless, this is sufficient to prevent adequate writing of data on the tape or the subsequent reading of the data. Consequently, it is essential that all small adhering particles be removed from the magnetic surface of the tape.

A source of new error-creating particles on the recording surface has been discovered to be particles which initially adhere to the back side (non-magnetic surface) of the tape and later transfer to the magnetic side during normal storage. These back side particles do not initially cause write errors because they are not on the recording surface. But over a period of time when the tape is in storage, some of these particles transfer to the magnetic surface while contact exits between adjacent coil windings within a tape reel. As a consequence, new errors may arise during any later use of the tape, even though initial use of the tape may have been virtually error free. Some of the particles on the magnetic surface of the tape are embedded in that surface to the extent that they cannot be removed by scraper blades moving across the tape. In such case, the tape drive must be stopped, and an operator must manually remove the particle with a knife blade.

It is, therefore, the primary object of this invention to improve the condition of magnetic tape for use on digital tape drives.

It is another object of this invention to greatly decrease the number of errors occurring when writing on or reading from digital tape for the first time.

It is still another object of this invention to greatly decrease the number of errors occurring when writing on or reading from digital magnetic tape after the tape has been used a number of times and has been stored between such reuse.

It is a further object of this invention to condition digital tape so that less operator time is required for manually cleaning tape.

This invention comprises heating a roll of tape until the temperature reaches a value where the relative adherence of particles to the magnetically-coated surface is greater than to the engaging adjacent non-coated web surface in the roll of tape. This temperature is above room temperature and below the glass transition temperature for both the plastic material in the tape web and coating. This heating operation causes the particles to transfer to the oxide-binder coated surface. Then, the tape is chilled until the web and coating plastics are relatively incompressible but where the tape can nevertheless be flexed without any danger of cracking, which is a temperature below room temperature but above the brittle point temperature for the plastic materials in the tape. Afer cooling and before the tape has had a chance to substantially become warmer, each side of the tape is run over a cleaner blade which scrapes each side of the tape to remove particles therefrom. The chilling operation makes the coating and web less compressible so that when small particles on the tape surface are engaged by the cleaner blade, they cannot easily pass beneath the blade due to the compressibility of the tape, to eliminate a basic reason why many particles have not been removed by the prior method of scraping a tape surface with the same type of blade.

With this invention, the tape surface may be scraped by the blade after either the heating or cooling operation described above with the elimination of the other. An improvement in tape error performance has been noted in either case, but the combination of both in the manner described above has been found to give results superior to either method alone.

The foregoing and other objects, features and advantages of the invention will be apparent from the following more particular description of the preferred embodiment of the invention, as illustrated in the accompanying drawings.

Figure 1:
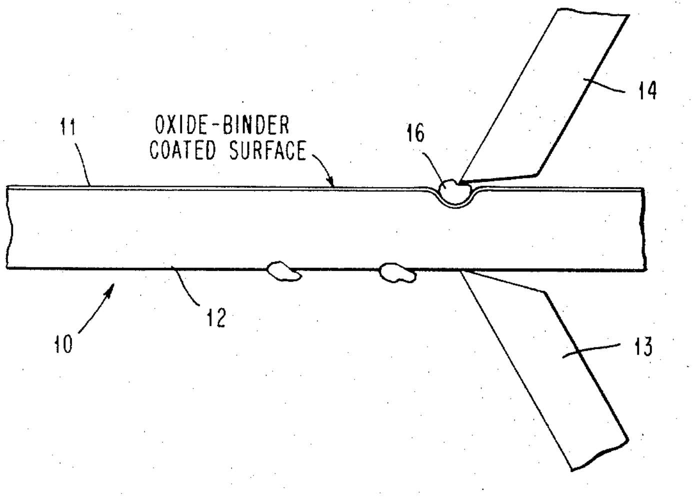
FIG. 1 illustrates a tape having particles adhering to both sides.

In FIG. 1, the tape comprises a web of Mylar polyester film 12 (Mylar is a trademark of the Du Pont Company) having a magnetic surface 11 which comprises a thin coating of magnetic particles in binder uniformly spread over one side of the web and firmly adhering thereto to provide a magnetic surface. Two blades 14 and 13 are shown attempting to scrape the opposite sides of the web to remove the particles adhering to the respective sides. If this scraping is done at room temperature, the scraping is not effective against particles such as particle 16 which compresses into the tape surface under blade 14 and it hence is not removed. The resilience of the plastic web and the adherence of the particle to the surface enables it to escape the blade. Blade 13 similarly encounters some particles that pass beneath blade 13 due to their adherence to the plastic non-magnetic surface.

This invention removes a much higher percentage of particles than has heretofore been possible by merely using blades 14 and 13 at room temperatures following a manufacturing process for the tape.

Figure 2:
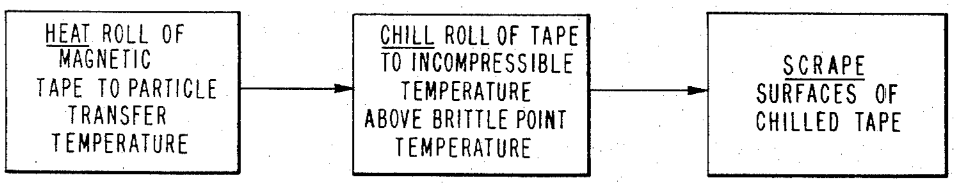
FIGS. 2 and 3 are flow diagrams representing the process of this invention.

FIG. 2 illustrates the process of this invention which involves first heating a roll of magnetic tape until the temperature throughout the roll reaches a point where the magnetic surface 11 becomes more tacky than the web backing so that the particles tend to adhere to the coating rather than to the backing. This causes a transference of the particles to the magnetic surface. This temperature is below the glass transition temperature and above room temperature. For tape having a Mylar web and a coating of acrylonitrile butadiene and acrylonitrile styrene, the temperature should be between 90° and 120° F. with an optimum temperature of about 100° F. Above 120° F. an undesirable situation occurs where the particle unduly adheres to both sides and results in the magnetic surface being torn off by the particle adhereing to the back side when the tape is unwound.

Thus the optimum temperature is the temperature at which maximum transference is obtained to the oxide surface.

After the equilibrium temperature is obtained from heating, the tape is chilled to an equilibrium temperature within a range from about 50° Fahrenheit (F.) to about 60° F. above the brittle point temperature for the plastic materials involved. About 40° F. is optimum for a Mylar tape. The choice of a cooling temperature is determined by the relative incompressibility obtainable for the coating and web plastic materials when the blade attempts to remove a particle and a compression force is involved as well as the shearing force. The incompressibility characteristic prevents the particle from being pushed into the surface where it might pass under the blade and avoid being removed.

Before the chilled tape can rise substantially in temperature, it is placed on a tape tester having blades such as 13 and 14, as shown in FIG. 1, and the tape on the roll is passed between the blades scraping particles from both sides. As a result, almost all of the particles adhering to both sides of the tape are removed.

The chilled web does not have the resilience found at room temperature and particles such as 16, cannot slip beneath the blade and are removed in cases where they would not be removed on a web being scraped at room temperature. Furthermore, there is a substantial transference of particles from the non-oxide side to the oxide side due to the heating process so that the particles are placed in a better position for removal by the blades. As a result, it has been discovered that less than half the number of initial write errors occur on tape having particles removed by this procedure than for tape scraped at room temperature without using the method of this invention. Also, less write errors and corresponding read errors occur after large usage and substantial storage of a roll of tape conditioned by this invention compared to the conventional room temperature conditioning method.

The above-described using both heating and chilling prior to scraping of tape is the preferred mode of performing this invention involving heating to 100° F. and chilling to 50° F. prior to scraping of a tape having a coating of oxide in a binder of acrylonitrile butadiene and acrylonitrile styrene on a Mylar web.

Figure 3:
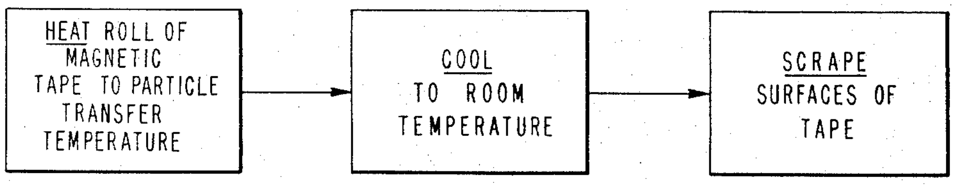

However, this invention may also be effectively used by eliminating one of the two operations prior to scraping, although it is not as effective as the preferred mode described above. Thus the scraping may follow the heating operation alone or the scraping may follow the chilling operation alone. Thus in FIG. 2, the initial step of heating the roll may be eliminated and only the chilling operation performed followed by scraping. Likewise, the operation shown in FIG. 3 may be used instead which involves only heating the roll to the temperature which obtains optimum transfer of particles to the coated tape surface from the back of the adjacent coil in the roll. After heating, the coil is cooled to room temperature before being scraped. It has been found that an improvement in the reduction of write errors for the tape is obtained using either the heating method or the chilling mthod alone followed by scraping; but neither of these methods alone is as effective in reducing write errors on digital magnetic tape as the heating operation followed by chilling and scraping.

This invention makes use of the pressure existing between the coils on a roll of tape, which has been measured to vary from 10 to over 1000 lbs. per square inch. This force acts on the particle with the greater tackiness of one of the surfaces to cause the particles to transfer to that surface when the roll is later unwound for scraping.

The maximum temperature should not exceed a value which softens both sides to the extent that they may adhere at some points which may cause the oxide coating to be torn loose when the roll is later unwound. Thus the maximum of 120° appears to exist with the example of tape mentioned above. The blades 13 and 14 are with very light pressure on the tape and they may be constructed and used as disclosed and claimed in U.S. patent application Ser. No. 317,251, filed Oct. 18, 1963, by Carl Peter Hayunga, tilted "Tape Cleaning Apparatus and Method," now Patent No. 3,370,982 dated Feb. 27, 1968.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of preconditioning magnetic tape prior to use on a digital tape drive, including the steps of:
heating a roll of said tape to a temperature within the range of 90° to 120° F. until a uniform temperature is established within the roll,
cooling the roll to room temperature,
and scraping each surface of said tape.

2. A method of preconditioning a roll of magnetic tape at an initial temperature at which one tape surface is tacky with respect to an engaging tape surface comprising the steps of:
chilling said roll of tape to a temperature above the brittle point temperature of the plastic compositions in the tape and below room temperature,
and scraping the surfaces of said tape.

3. A method of preconditioning magnetic tape prior to use on a digital tape drive comprising the steps of:
heating a roll of said tape to a temperature in which one surface of the tape is more tacky than the engaging other surface of the tape in said roll,
chilling said roll of tape to a temperature above the brittle point temperature of the plastic materials in said tape and below room temperature,
and scraping the surfaces of said tape prior to the tape rising to room temperature.

4. A method of preconditioning tape as defined in claim 3 in which said scraping is done by:
pulling said tape between a pair of blades biased against the surface of said tape.

5. A method of preconditioning tape as defined in claim 3 in which said heating temperature is within the range from 90° to 120° F.

6. A method of preconditioning tape as defined in claim 5 in which said heating temperature is approximately 100° F.

7. A method of preconditioning magnetic tape as defined in claim 3 in which said chilling temperature is within the range of 35° to 45° F.

8. A method of preconditioning tape as defined in claim 7 in which said chilling temperature is approximately 40° F.

References Cited

UNITED STATES PATENTS

| | | | |
|---|---|---|---|
| 2,254,075 | 8/1941 | Lawson | 134—9 |
| 2,735,793 | 2/1956 | Hoke | 134—6 |
| 2,854,360 | 9/1958 | Pajes | 134—15 |
| 3,370,982 | 2/1968 | Hayunga | 134—9 |

MORRIS O. WOLK, *Primary Examiner.*

J. T. ZATARGA, *Assistant Examiner.*

U.S. Cl. X.R.

134—9, 17, 30